US012664311B2

(12) United States Patent
Betancourt

(10) Patent No.: US 12,664,311 B2
(45) Date of Patent: Jun. 23, 2026

(54) INTEGRATED LOGGING LIBRARY FOR OBFUSCATING SENSITIVE INFORMATION

(71) Applicant: Capital One Services, LLC, McLean, VA (US)

(72) Inventor: Pedro Betancourt, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 89 days.

(21) Appl. No.: 18/622,518

(22) Filed: Mar. 29, 2024

(65) Prior Publication Data

US 2025/0307463 A1     Oct. 2, 2025

(51) Int. Cl.
*G06F 21/62* (2013.01)
*G06F 11/34* (2006.01)

(52) U.S. Cl.
CPC ...... *G06F 21/6254* (2013.01); *G06F 11/3476* (2013.01)

(58) Field of Classification Search
CPC .......................... G06F 21/6254; G06F 11/3476
See application file for complete search history.

(56) References Cited

U.S. PATENT DOCUMENTS

| | | | | |
|---|---|---|---|---|
| 12,361,006 | B1 * | 7/2025 | Brandwine | ......... G06F 21/6254 |
| 2020/0311304 | A1 * | 10/2020 | Parthasarathy | ..... G06F 11/3006 |
| 2020/0311306 | A1 * | 10/2020 | Kim | ......................... G09C 5/00 |
| 2021/0034719 | A1 * | 2/2021 | Brown | ................... G06F 21/14 |
| 2022/0335158 | A1 | 10/2022 | Xu et al. | |
| 2025/0053684 | A1 * | 2/2025 | Albero | ................... G06F 21/84 |
| 2025/0139288 | A1 * | 5/2025 | Kulkarni | .............. G06F 21/604 |

* cited by examiner

*Primary Examiner* — Anh Nguyen
(74) *Attorney, Agent, or Firm* — Harrity & Harrity, LLP

(57) ABSTRACT

In some implementations, a device may configure, for a component that uses a platform, a logging library that is associated with a logging framework configured for the platform, wherein the logging library is configured to obfuscate the sensitive data. The device may obtain, for the component, component data via the platform, wherein the component data is associated with one or more operations of the component. The device may generate, via the logging framework, log data that includes obfuscated data generated via the logging library based on obtaining the component data, wherein the obfuscated data obfuscates any sensitive information in the log data. The device may perform, via the component, one or more actions using the log data.

20 Claims, 5 Drawing Sheets

100

Platform

Component 1

Component 2

Component N

120: Configure non-compliant component(s) with the logging library

115

110
Identify any non-compliant components that do not have a logging library configured 105
Identify components configured to integrate with a platform Log Management Device Perform control operation(s)

125
Report of non-compliant component(s)

Client Device

300

Bus
310

Processor
320

Memory
330

Input
Component
340

Output
Component
350

Communication
Component
360

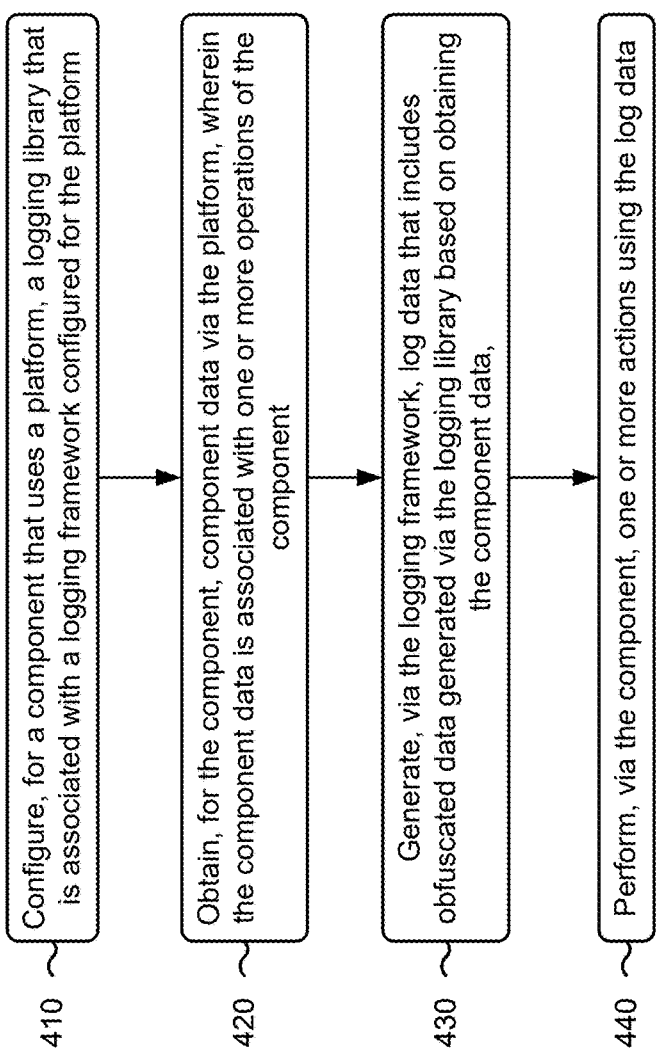

400

410 Configure, for a component that uses a platform, a logging library that is associated with a logging framework configured for the platform 420 Obtain, for the component, component data via the platform, wherein the component data is associated with one or more operations of the component 430 Generate, via the logging framework, log data that includes obfuscated data generated via the logging library based on obtaining the component data, 440 Perform, via the component, one or more actions using the log data

FIG. 4

INTEGRATED LOGGING LIBRARY FOR OBFUSCATING SENSITIVE INFORMATION

BACKGROUND

Data masking or data obfuscation is the process of hiding original data with modified content, such as symbols, characters, and/or other data. Data masking may be used to protect data that is classified as personally identifiable information, sensitive personal data, and/or commercially sensitive data, among other examples. Data masking may modify the original data (e.g., to protect or hide sensitive data) while maintaining a format or appearance of the data to ensure that the data remains useful.

SUMMARY

Some implementations described herein relate to a system for an integrated logging library for obfuscating sensitive information. The system may include one or more memories and one or more processors communicatively coupled to the one or more memories. The one or more processors may be configured to identify one or more components that are configured to integrate with a platform that outputs the sensitive information. The one or more processors may be configured to perform, for the platform, one or more control actions associated with configuring a logging library for the one or more components, wherein the logging library is configured to obfuscate the sensitive information in logs of the one or more components, and wherein the logging library is integrated within a logging framework that is configured for the platform. The one or more processors may be configured to obtain, for a component of the one or more components, component data via the platform, wherein the component data is associated with one or more operations of the component. The one or more processors may be configured to generate, via the logging framework and based on the component data, log data that includes obfuscated data generated via the logging library, wherein the obfuscated data obfuscates any sensitive information in the log data. The one or more processors may be configured to perform, via the component, one or more actions using the log data.

Some implementations described herein relate to a method for obfuscating sensitive data. The method may include configuring, by a device and for a component that uses a platform, a logging library that is associated with a logging framework configured for the platform, wherein the logging library is configured to obfuscate the sensitive data. The method may include obtaining, by the device and for the component, component data via the platform, wherein component data is associated with one or more operations of the component. The method may include generating, by the device and via the logging framework, log data that includes obfuscated data generated via the logging library based on obtaining the component data, wherein the obfuscated data obfuscates any sensitive information in the log data. The method may include performing, by the device and via the component, one or more actions using the log data.

Some implementations described herein relate to a non-transitory computer-readable medium that stores a set of instructions. The set of instructions, when executed by one or more processors of a device, may cause the device to identify one or more components that are configured to integrate with a platform that outputs sensitive information. The set of instructions, when executed by one or more processors of the device, may cause the device to perform, for the platform, one or more control actions associated with configuring a logging library for the one or more components, wherein the logging library is configured to obfuscate the sensitive information in logs of the one or more components, and wherein the logging library is integrated within a logging framework that is configured for the platform. The set of instructions, when executed by one or more processors of the device, may cause the device to cause log data to be generated via the logging framework and based on component data of a component, wherein the log data includes obfuscated data generated via the logging library, wherein the obfuscated data obfuscates any sensitive information in the log data. The set of instructions, when executed by one or more processors of the device, may cause the device to store, via the component, the log data in a log repository.

BRIEF DESCRIPTION OF THE DRAWINGS

FIG. 4 is a flowchart of an example process associated with an integrated logging library for obfuscating sensitive information, in accordance with some embodiments of the present disclosure.

DETAILED DESCRIPTION

Figure 1A:
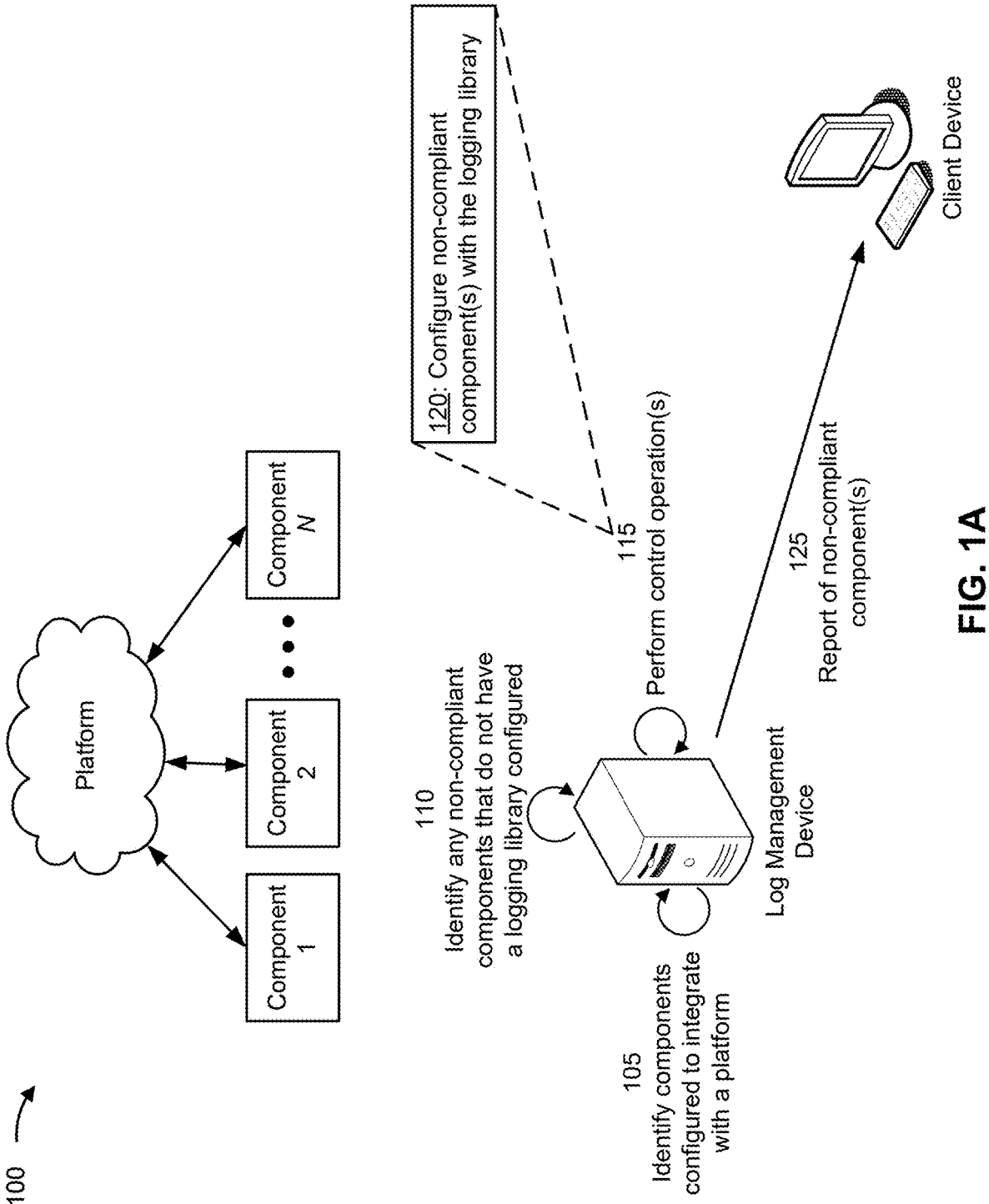
FIGS. 1A-1B are diagrams of an example associated with an integrated logging library for obfuscating sensitive information, in accordance with some embodiments of the present disclosure.

The following detailed description of example implementations refers to the accompanying drawings. The same reference numbers in different drawings may identify the same or similar elements.

A device may execute one or more processes and/or one or more applications to enable the device to perform actions. In some cases, a process and/or application executed by the device may generate data associated with the actions performed by the device. As used herein, a device that generates data may be referred to as a source device and/or an application server. In some cases, a source device (and/or an application executing on the device) may generate a log associated with an action or operation performed by the source device. A log may include data associated with events that have occurred in association with an application executing on the source device. For example, a log may identify one or more scripts, queries, operations, jobs, and/or other information designed to provide information regarding the status of data processing jobs. As another example, a log may indicate information used to perform one or more processes and/or one or more applications. As another example, a log may indicate information obtained from another source, such as a platform. In some cases, the source device may transmit log data to another device (e.g., a destination device) to enable the other device to analyze, store, and/or compile log data from multiple source devices.

However, in some cases, the source device may generate log data that includes sensitive information. "Sensitive information" may refer to information that is confidential, secret, personal, and/or otherwise protected. The source device may not detect that the log data includes sensitive information and may share the log data with a destination device. As a result, the source device may inadvertently make an unauthorized disclosure of the sensitive information (e.g., that is identified in the log data) by transmitting the log data to the destination device that is outside of an environment associated with the source device and/or that is associated with a different entity than an entity associated with the source device. Such unauthorized disclosures of sensitive information may result in legal liability and/or financial liability for the entity associated with the source device. Moreover, the generation of log data that includes sensitive information presents a risk of unauthorized disclosures of the sensitive information because the log data that includes the sensitive information is generated and/or stored in memory on the source device. The generation and/or storage of the log data that includes sensitive information presents security risks and/or increases the likelihood of unauthorized disclosures of sensitive information.

In some examples, an entity associated with the source device may attempt to scan and mask sensitive information identified in log data. For example, a centralized architecture for scanning and masking sensitive information may be used. The centralized architecture may include a source device (or a group of source devices) transmitting data (e.g., log data) to a central server device (or a group of central server devices) that performs scanning and masking of sensitive information at the central server device. The central server device may identify sensitive information in the log data, may mask the identified sensitive information (e.g., by removing or modifying the sensitive information), and may transmit the masked log data to a final destination. However, the centralized architecture requires that the source device transmit log data (e.g., that may include sensitive information) to the central server device (e.g., over a network). Transmitting the log data to the central server device introduces a risk that log data that identifies sensitive information may be disclosed (e.g., as the log data may be intercepted by a malicious actor and/or may be transmitted to a device outside of the environment associated with the source device). Moreover, the centralized architecture is unable to process large amounts of data. For example, the source device (or group of source devices) may execute applications or programs that generate hundreds, thousands, or millions of logs daily. As the centralized architecture may include a central server device that receives log data from multiple source devices, the central server device may be unable to process (e.g., scan and mask) the large amounts of log data generated by the multiple source devices. As a result, the centralized architecture may be unable to be used with large data inputs, such as where multiple source devices generate hundreds, thousands, or millions of logs daily.

In some examples, a source device may perform scanning and masking of data at the source device using a program or application executing on the source device. For example, a platform may be associated with a destination device of log data generated by the source device. The platform may provide an application that scans and masks log data at the source device before the source device transmits the log data to the destination device associated with the platform. However, the application must be invoked each time that log data is generated, to ensure that all log data is checked for sensitive information and has any sensitive information masked. For example, the application may be a separate function from the generation of the log data, and the application may only execute when invoked via instructions. This consumes processing resources, computing resources, power resources, and/or memory resources associated with invoking the application each time that log data is generated. Further, the separate application or function for scanning for and/or masking sensitive information increases the complexity of the log generation operation and/or presents a risk of unauthorized disclosures of sensitive information (e.g., because if log data is generated and the application is not invoked for some reason, then log data including sensitive information may be transmitted to another device). Moreover, the generation itself of log data that includes sensitive information presents a risk of unauthorized disclosures of the sensitive information because the log data that includes the sensitive information is generated and/or stored in memory on the source device. For example, the log data that includes sensitive information may be generated and provided to the application, thereby presenting security risks and/or increasing the likelihood of unauthorized disclosures of sensitive information. Additionally, it may be difficult to ensure that each source device has access to and/or is configured to use the application. As a result, a source device may generate and/or transmit log data that includes sensitive information because the source device does not have access to and/or is not configured to use or execute the application.

Some implementations described herein enable an integrated logging library for obfuscating sensitive information. For example, the logging library may be integrated into a logging framework that is used to generate logs. The logging library may be configured to obfuscate sensitive information. The logging library may include one or more rules, policies, or other information to detect and obfuscate sensitive information. The logging library may be integrated within the logging framework that is configured for a platform, an application, and/or a component, among other examples. For example, the logging library may be an extension (e.g., a feature, a function, and/or a plugin) of the logging framework. As a result, the logging library may be executed and/or applied for all generated log data (e.g., regardless of whether obfuscation or masking is invoked for the generation of the log data).

In some implementations, a device may obtain component data, such as via a platform. Component data may be data associated with an execution of one or more processes and/or one or more applications that enable the device to perform actions. For example, component data may be data that is associated with (e.g., that is used for, that is output by, and/or that is otherwise associated with) one or more operations of a component, an application, and/or the device. The device may generate, via the logging framework and based on the component data, log data that includes obfuscated data generated via the logging library. The obfuscated data may obfuscate any sensitive information in the log data. For example, the log data may be generated with obfuscated data based on the integration of the logging library within the logging framework.

In some implementations, the device (or a system associated with the device) may perform one or more control operations associated with the logging library. For example, the device may identify one or more components that are configured to integrate with a platform that outputs sensitive information. The device may perform, for the platform, one or more control actions associated with configuring a logging library for the one or more components. For example, the device may transmit a report indicating any components, from the one or more components, that do not have the logging library configured in the logging framework. As another example, the device may configure any non-compliant components, from the one or more components, with the logging library for the logging framework.

As a result, the techniques and implementations described herein may improve the security of sensitive information because the integrated logging library increases the likelihood that log data is generated without sensitive information (e.g., with obfuscated information rather than with sensitive information). By generating the log data with obfuscated information (e.g., rather than first generating the log data via a first function, and second masking sensitive information in the log data via a second function), the security of the sensitive information is improved because the sensitive information is never included in the log data and/or is never stored via the source device and/or is not provided to a separate application that performs the masking of the sensitive information. This improves the security of the sensitive information because vulnerabilities introduced via the separate application, via providing the log data to the separate application, and/or via the generation of log data that includes sensitive information, among other examples, may be mitigated or eliminated. For example, the security of the sensitive information may be improved because the sensitive information is not transmitted via an interface between the logging framework and the application configured to detect and/or mask sensitive information, thereby mitigating and/or eliminating vulnerabilities that may be introduced via the interface.

Additionally, by integrating the logging library within the logging framework, a function associated with detecting and/or masking sensitive information in generated logs does not need to be invoked or instructed for the generation of log data. This reduces the complexity of the logging operation because the device does not store and/or execute instructions to cause the application (e.g., configured to detect and/or mask sensitive information) to be invoked each time log data is generated. This conserves processing resources, computing resources, power resources, and/or memory resources, among other examples, that would have otherwise been associated with storing and/or executing instructions to cause the application (e.g., configured to detect and/or mask sensitive information) to be invoked each time log data is generated.

As another example, the one or more control operations described herein may ensure that any component or application that has access to a platform that may output or provide sensitive information is configured with the logging library. This improves the security of the sensitive information that is output or provided by the platform because any component or application that is configured to access the platform may have the logging library to obfuscate the sensitive information as described herein.

Figure 1B:
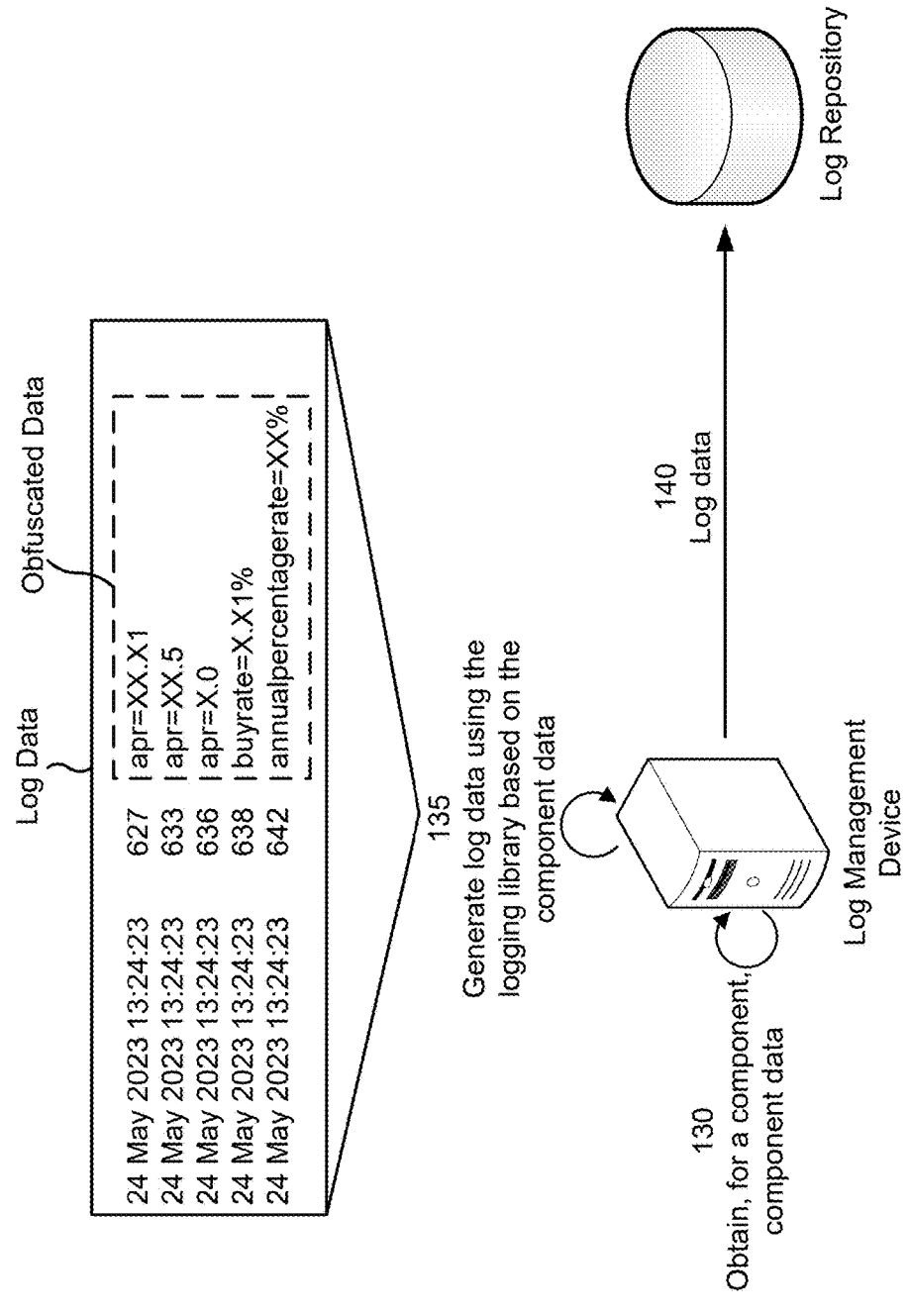

FIGS. 1A-1B are diagrams of an example 100 associated with an integrated logging library for obfuscating sensitive information. As shown in FIGS. 1A-1B, example 100 includes a log management device, a client device, and a log repository. These devices are described in more detail in connection with FIGS. 2 and 3. The log management device may be a device, component, or system, among other examples, that is associated with generating one or more logs for one or more components of a platform. For example, in some implementations, the log management device may be a source device for log data. Additionally, or alternatively, the log management device may be a device, component, or system, among other examples, that is associated with managing, configuring, and/or otherwise controlling log generating for components that integrate with or access the platform.

As shown in FIG. 1A, and by reference number 105, the log management device may identify one or more components that are configured to integrate with the platform. The platform may be configured to output, provide, and/or otherwise use sensitive information. "Sensitive information" may refer to information that is confidential, secret, personal, and/or otherwise protected. As an example, sensitive information may be information that is subject to one or more regulatory requirements to maintain the secrecy or confidentiality of the information (e.g., antitrust regulations or other regulations promulgated by a regulatory agency). In some implementations, the sensitive information may be sensitive business information. For example, the platform may collect and/or provide information associated with one or more entities, vendors, or companies, and the sensitive information may include competitively sensitive information provided by the one or more entities, vendors, or companies. As another example, sensitive information may include personally identifiable information of an individual, such as a social security number, a name, an address, and/or income information, among other examples.

As used herein, a component that is configured to "integrate" with the platform may refer to a component that can access or communicate with the platform. For example, a component that integrates with the platform may be configured to seamlessly, within an ecosystem of the platform, use resources and functionalities of the platform to enhance capabilities of the component. The integration may include ensuring compatibility with the platform's framework and adhering to guidelines of the platform to prevent conflicts and ensure smooth operation. For example, a component that is configured to integrate with the platform may be configured to utilize an application programming interface (API) or other interface of the platform. This enables the component to establish communication channels with the platform, enabling the component to access and leverage platform-specific features, services, and/or data storage, among other examples. The integration may include the exchange of data between the component and the platform, facilitating processes such as data processing, storage, and/or retrieval, among other examples.

As used herein, "component" may refer to hardware, firmware, or a combination of hardware and software. For example, a component may be a device or a system, such as the component(s) described in connection with FIG. 3. Additionally, or alternatively, a component may be an application (e.g., executing on a device or cloud computing system), a cloud computing resource (e.g., a virtual machine, a container, and/or a serverless function), and/or a source device (and/or an application executing on a source device), among other examples.

The log management device may gather an inventory of all components that integrate with the platform. For example, the log management device may search (e.g., scan) for identifiers of components that integrate with the platform. As an example, the platform may store identifiers of respective components that are configured to (e.g., registered to) communicate with an API or other communication interface of the platform. The log management device may identify the one or more components that are configured to integrate with the platform based on the identifiers of respective components that are configured to (e.g., registered to) communicate with an API or other communication interface of the platform. For example, the identifiers may identify the one or more components that are configured to integrate with the platform.

As another example, the log management device may search (e.g., scan) configurations of respective components for information associated with the platform. For example, the log management device may search the configurations for configuration information of the platform, an indicator of the API or other communication interface of the platform, and/or other information indicating that the component is configured to integrate with the platform. If a configuration of a component includes the information associated with the platform, then this may be indicative of the component being configured to integrate with the platform. If the configuration of a component includes the information associated with the platform, then the log management device may identify or determine that the component is configured to integrate with the platform.

The log management device may periodically search for or scan for components that are configured to integrate with the platform. For example, the log management device may search for or scan for components that are configured to integrate with the platform in accordance with a periodic schedule (e.g., once every 12 hours, once per day, once per week, and/or once per month). The log management device may compare the identified components to one or more known components that are previously identified (e.g., by the log management device) as being configured to integrate with the platform. This may enable the log management device to identify any new components that have been recently configured to integrate with the platform. The log management device may perform one or more operations (e.g., control operations) described herein with the new components. This may conserve processing resources, computing resources, and/or memory resources, among other examples, that would have otherwise been used to perform the one or more operations for known components for which the one or more operations were previously performed.

As shown by reference number 110, the log management device may identify any non-compliant components that do not have a logging library configured. As used herein, "non-compliant" component may refer to a component that is configured to integrate with the platform and that does not have the logging library configured in a logging framework (e.g., of the component and/or of the platform). A logging framework may be a software tool or library used in software development to record information about the execution of a component. The logging framework may enable developers to configure the component to generate logs that facilitate tracking the behavior of the component during runtime by capturing one or more events, messages, errors, and/or warnings, among other examples. In some implementations, the logging framework may integrate with a software ecosystem or computing platform of the component and/or the platform. For example, if the component and/or the platform uses the JAVA software ecosystem or computing platform, then the logging framework may be a JAVA-based logging framework. An example of a JAVA-based logging framework may be the Log 4j logging framework.

The logging library may be integrated within the logging framework that is configured for the platform and/or one or more components. For example, the logging library may be built or configured within the logging framework. The logging library may be configured using the software ecosystem or computing platform of the logging framework. For example, the logging library may be a module or an extension built within the logging framework. As an example, the logging library may be a plugin of the logging framework.

The logging library may add additional functionality and/or capabilities to the logging framework. For example, the logging library may be configured to obfuscate sensitive information in logs of the one or more components (e.g., that are generated via the logging framework). For example, the logging library may be configured to enable the logging framework to scan for, detect, and/or mask sensitive information during the generation of log data by the logging framework.

The log management device may identify non-compliant components by searching, analyzing, and/or otherwise processing logging configurations of the logging framework for respective components of the one or more components (e.g., that are configured to integrate with the platform). For example, the log management device may identify whether each component that is configured to integrate with the platform is configured with the logging library. Additionally, the log management device may identify whether each component that is configured to integrate with the platform is configured with the most recent version or update of the logging library. For example, a non-compliant component may be a component that is configured with an out-of-date version, an obsolete version, and/or old version of the logging library.

As shown by reference number 115, the log management device may perform one or more control operations. The log management device may perform the one or more control operations for the one or more non-compliant components. For example, the one or more control operations may be associated with ensuring that all components that are configured to integrate with the platform are configured with the logging library.

For example, as shown by reference number 120, the one or more control operations may include configuring the one or more non-compliant components with the logging library. For example, the log management device may configure any non-compliant components, from the one or more components that are configured to integrate with the platform, with the logging library for the logging framework. For example, the log management device may transmit, and a non-compliant component may receive, configuration information that includes the logging library. This may cause the non-compliant component to configure the logging library as part of the logging framework. For example, the non-compliant component may configure, based on receiving the configuration information, the logging library as part of the logging framework, thereby causing the non-compliant component to become a compliant component.

As another example, as shown by reference number 125, the one or more control operations may include transmitting a report of non-compliant components. For example, the log management device may transmit, and the client device may receive, the report of non-compliant components. The log management device may transmit a report indicating any components, from the one or more components configured to integrate with the platform, that do not have the logging library configured in the logging framework. The client device may display or otherwise output the report of the non-compliant component(s). This may enable a developer (e.g., that is using the client device) to identify which components are configured to integrate with the platform and do not have the logging library configured. The developer may take one or more actions to configure the non-compliant component(s) with the logging library.

The one or more control operations may facilitate the configuration of the logging library for components that are separately or individually configured apart from the platform. For example, the one or more components may be managed and/or configured separately from the platform, thereby increasing the complexity and/or difficulty of ensuring that the separately managed and/or configured components do not generate log data that includes sensitive information provided by the platform. The one or more control components may enable the log management device to improve the likelihood of obfuscating sensitive information in logs generated by the one or more components (e.g., where the sensitive information is provided by the platform) by improving the likelihood that any component that is configured to integrate with or access the platform has the logging library configured within the logging framework.

As shown in FIG. 1B, and by reference number 130, the log management device may obtain, for a component, component data. "Component data" may refer to data that is associated with (e.g., used for, produced by, used as an input for, or otherwise associated with) one or more operations, tasks, jobs, or other events associated with an execution of the component. In some implementations, the component data may be obtained (e.g., by the component) via the platform. For example, the component (e.g., via the log management device or another device) may perform one or more operations, tasks, and/or jobs, among other examples via data obtained from the platform. The data obtained from the platform may include sensitive information. For example, the component data may include, or may be based on, the sensitive information obtained from the platform.

As shown by reference number 135, the log management device may generate (or may cause the component to generate) log data using the logging library and based on the component data. For example, causing the component to generate log data may refer to the log management device configuring the component with the logging library, as described herein. In some implementations, the component may be executed on a device or system that is separate from the log management device. In such example, the component may generate the log data via the logging framework using the device or the system. In some other implementations, the log management device may generate the log data via the logging framework (such as in examples where the component is executed on the log management device or using resources of the log management device).

For example, the component (e.g., via the log management device or another device) may generate, via the logging framework and based on the component data, log data that includes obfuscated data generated via the logging library. The obfuscated data may obfuscate any sensitive information that would otherwise be included in the log data. For example, the logging library may indicate one or more obfuscation rules. The generation or obtaining of the component data may trigger the one or more obfuscation rules to be applied to the log data during the generation of the log data.

An obfuscation rule may be a rule or set of parameters to be used by the logging framework (e.g., by the component executing the logging framework) to detect and/or mask sensitive information. In some implementations, an obfuscation rule may indicate or define a pattern of one or more keywords that are indicative of sensitive information. For example, an obfuscation rule may enable the logging framework to match keyword patterns in different fields of the log data to identify sensitive information as defined by the obfuscation rule.

As described above, sensitive information may include information that is confidential, secret, personal, and/or otherwise protected. For example, sensitive information may include personally identifiable information, competitively sensitive information, trade secret information, a personal identification number (PIN), an account number, an account balance, a telephone number, a password, an address, a social security number, a bearer token, a security token, an encryption key, a card number (e.g., a credit card or debit card number), a security code, and/or a billing account number, among other examples. An obfuscation rule may enable the logging framework (e.g., by the component executing the logging framework) to scan (e.g., search) data generated by the logging framework for sensitive information. For example, an obfuscation rule may be a regular expression rule. A regular expression rule may be a sequence of characters that define a search pattern that can be used by the logging framework to identify sensitive information in log data generated by the logging framework. For example, a regular expression rule may be written in a JavaScript Object Notation (JSON) format.

In some implementations, an obfuscation rule may be in a form other than a regular expression rule. For example, an obfuscation rule may be an artificial intelligence and/or machine learning based obfuscation rule. In some implementations, an obfuscation rule may include a regular expression rule and a function. For example, the obfuscation rule may enable the logging framework to identify sensitive information in data (e.g., using the regular expression rule) and to validate that the identified sensitive information is valid (e.g., real) sensitive information (e.g., using the function). For example, an obfuscation rule may enable the logging framework to identify sensitive information in data (e.g., in a log) generated by the logging framework. The obfuscation rule may enable the logging framework to determine whether the identified sensitive information is valid information. In some implementations, the logging framework may use a machine learning technique associated with a function of an obfuscation rule. The use of obfuscation rules that include a function may improve the ability of the logging framework to identify sensitive information. For example, some types of sensitive information may not be capable of being identified using a regular expression rule. By using an obfuscation rule that includes a function, the logging library may define a broader obfuscation rule that enables the logging framework to detect sensitive information with improved accuracy.

An obfuscation rule may indicate that the logging framework is to generate obfuscated sensitive information. For example, as shown in FIG. 1B, rather than generating the log data with the sensitive information, the logging library may enable the logging framework to generate the log data with obfuscated data. The obfuscated data may mask the sensitive information using a configurable mask for each identified element of sensitive information to obfuscate a majority (or all) of the element (e.g., by replacing the sensitive information with one or more characters, such as one or more letters (shown in FIG. 1B as "X"), or via other obfuscation techniques). As a result, an output of the logging framework (e.g., the log data) includes the obfuscated data (e.g., rather than the sensitive information). By reducing the likelihood that the logging framework outputs log data that includes sensitive information, the security of the sensitive information may be improved, because the component does not store or otherwise access log data that includes sensitive information.

As described elsewhere herein, the logging library may include one or more plugins for the logging framework. For example, the logging library may be included in a module or extension of the logging framework. In some implementations, the logging library may include configuration information that is configured to cause the logging library to be executed for any log data generated for the component via the logging framework. In other words, the logging library may configure or otherwise cause the logging framework to execute or apply the one or more obfuscation rules to all log data generated by the logging framework (e.g., before the logging framework outputs the log data). This reduces the complexity of detecting and/or masking the sensitive information because operations and/or applications (e.g., the component) do not have to be configured with an invocation of a sensitive information masking function. Instead, the logging framework may apply the one or more obfuscation rules to all log data generated by the logging framework. This may improve the security of the sensitive information because, even if an operation and/or application does not include instructions to invoke a sensitive information masking function, the logging framework will still detect and/or obfuscate any sensitive information that would have otherwise been included in log data.

The component (e.g., via the log management device and/or another device) may perform one or more actions using the log data. For example, as shown by reference number 140, the component (e.g., via the log management device and/or another device) may store the log data in a log repository. The log repository may be a centralized log repository for log data associated with the platform. As another example, the component (e.g., via the log management device and/or another device) may transmit the log data to a device, such as the client device.

As indicated above, FIGS. 1A-1B are provided as an example. Other examples may differ from what is described with regard to FIGS. 1A-1B.

Figure 2:
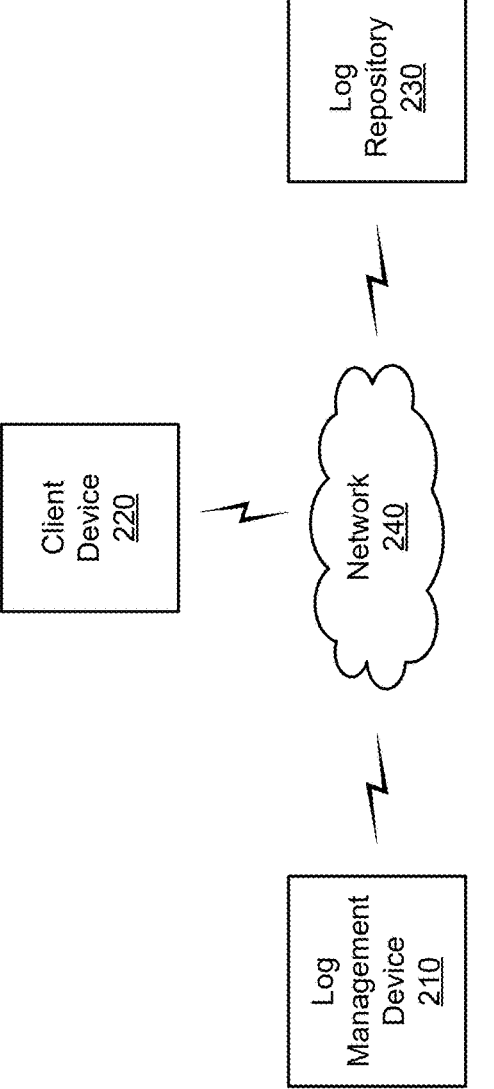
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a log management device 210, a client device 220, a log repository 230, and a network 240. Devices of environment 200 may interconnect via wired connections, wireless connections, or a combination of wired and wireless connections.

The log management device 210 may include one or more devices capable of receiving, generating, storing, processing, providing, and/or routing information associated with an integrated logging library for obfuscating sensitive information, as described elsewhere herein. The log management device 210 may include a communication device and/or a computing device. For example, the log management device 210 may include a server, such as an application server, a client server, a web server, a database server, a host server, a proxy server, a virtual server (e.g., executing on computing hardware), or a server in a cloud computing system. In some implementations, the log management device 210 may include computing hardware used in a cloud computing environment.

The client device 220 may include one or more devices capable of receiving, generating, storing, processing, and/or providing information associated with an integrated logging library for obfuscating sensitive information, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The log repository 230 may include one or more devices capable of receiving, generating, storing, processing, and/or providing information associated with an integrated logging library for obfuscating sensitive information, as described elsewhere herein. The log repository 230 may include a communication device and/or a computing device. For example, the log repository 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the log repository 230 may store log data, as described elsewhere herein.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
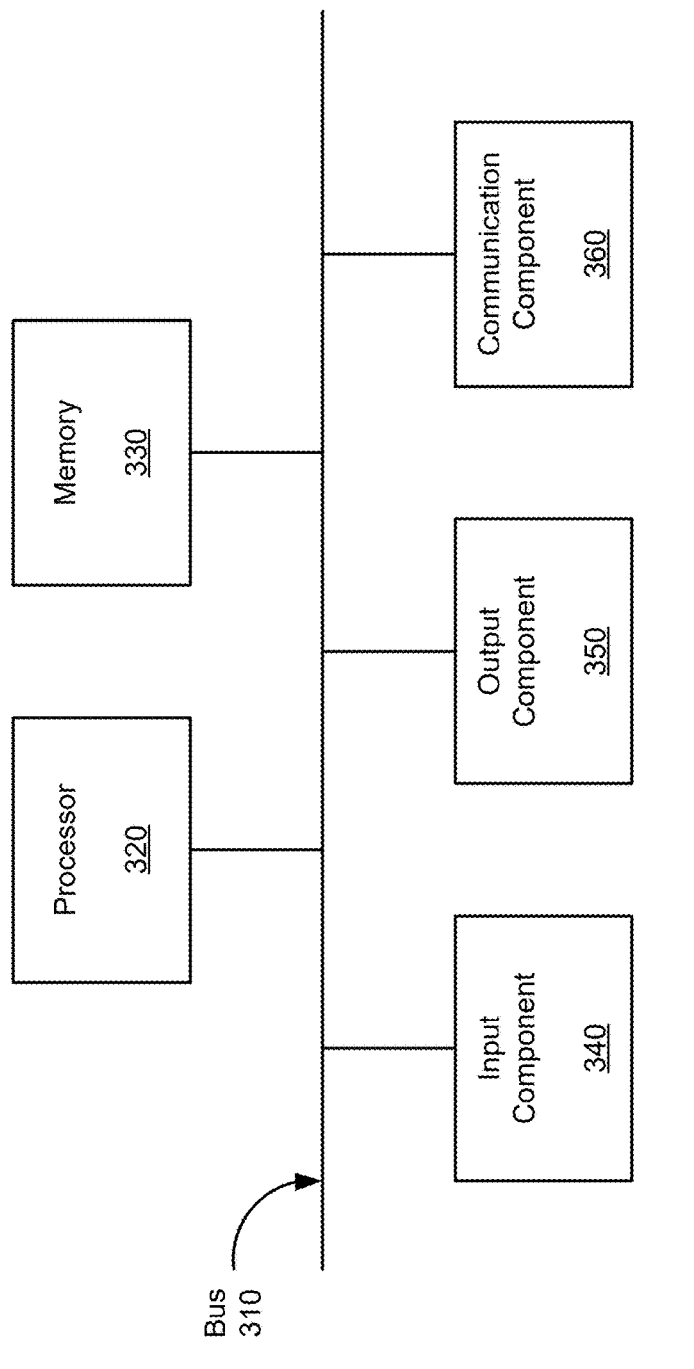
FIG. 3 is a diagram of example components of a device associated with an integrated logging library for obfuscating sensitive information, in accordance with some embodiments of the present disclosure.

FIG. 3 is a diagram of example components of a device 300 associated with an integrated logging library for obfuscating sensitive information. The device 300 may correspond to the log management device 210, the client device 220, and/or the log repository 230. In some implementations, the log management device 210, the client device 220, and/or the log repository 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with an integrated logging library for obfuscating sensitive information. In some implementations, one or more process blocks of FIG. 4 may be performed by a device (e.g., the log management device 210 or a device executing a component of a platform). In some implementations, one or more process blocks of FIG. 4 may be performed by another device or a group of devices separate from or including the log management device 210, such as the client device 220 and/or the log repository 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include configuring, for a component that uses a platform, a logging library that is associated with a logging framework configured for the platform (block 410). For example, the log management device 210 (e.g., using processor 320 and/or memory 330) may configure, for a component that uses a platform, a logging library that is associated with a logging framework configured for the platform, as described above in connection with reference number 115 and/or reference number 120 of FIG. 1A. In some implementations, the logging library is configured to obfuscate sensitive data (e.g., sensitive information). As an example, the log management device 210 may configure the logging framework for a component where the logging framework includes the logging library. The logging library may be a module, extension, and/or plugin, among other examples, of the logging framework.

As further shown in FIG. 4, process 400 may include obtaining, for the component, component data via the platform (block 420). For example, the log management device 210 (e.g., using processor 320 and/or memory 330) may obtain, for the component, component data via the platform, as described above in connection with reference number 130 of FIG. 1B. In some implementations, the component data is associated with one or more operations of the component. As an example, the component data may include sensitive information.

As further shown in FIG. 4, process 400 may include generating, via the logging framework, log data that includes obfuscated data generated via the logging library based on obtaining the component data (block 430). For example, the log management device 210 (e.g., using processor 320 and/or memory 330) may generate, via the logging framework, log data that includes obfuscated data generated via the logging library based on obtaining the component data, as described above in connection with reference number 135 of FIG. 1B. In some implementations, the obfuscated data obfuscates any sensitive information in the log data. As an example, the log management device 210 may cause the component to generate the log data that includes the obfuscated data (e.g., by configuring the component with the logging framework that includes the logging library). For example, generating the log data may include the logging framework detecting and/or masking sensitive information (e.g., via the logging library) prior to the logging framework outputting the log data.

As further shown in FIG. 4, process 400 may include performing, via the component, one or more actions using the log data (block 440). For example, the log management device 210 (e.g., using processor 320 and/or memory 330) may perform, via the component, one or more actions using the log data, as described above in connection with reference number 140 of FIG. 1B. As an example, the log management device 210 (and/or the component) may store the log data in the log repository 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for an integrated logging library for obfuscating sensitive information, the system comprising:

one or more memories; and one or more processors, communicatively coupled to the one or more memories, configured to:

identify one or more components that are configured to integrate with a platform that outputs the sensitive information;

perform, for the platform, one or more control actions associated with configuring a logging library for the one or more components based on identifying whether each of the one or more components is compliant with a most recent version or update of the logging library, wherein the logging library is configured to obfuscate the sensitive information in logs of the one or more components, wherein the logging library is integrated within a logging framework that is configured for the platform, and wherein the logging library includes configuration information that is configured to cause the logging library to be executed for any log data generated for the one or more components via the logging framework;

obtain, for a component of the one or more components, component data via the platform, wherein the component data is associated with one or more operations of the component;

generate, via the logging framework and based on the component data, log data that includes obfuscated data generated via the logging library, wherein the obfuscated data obfuscates any sensitive information in the log data; and perform, via the component, one or more actions using the log data.

2. The system of claim 1, wherein the logging library includes one or more plugins for the logging framework.

3. The system of claim 1, wherein the logging library indicates one or more obfuscation rules, wherein a generation of the component data triggers the one or more obfuscation rules to be applied to the log data.

4. The system of claim 1, wherein the one or more processors, to perform the one or more actions, are configured to: store, in a centralized log repository, the log data.

5. The system of claim 1, wherein the one or more processors, to perform the one or more control actions, are configured to: transmit a report indicating any components, from the one or more components, that do not have the most recent version or update of the logging library configured in the logging framework.

6. The system of claim 1, wherein the one or more processors, to perform the one or more control actions, are configured to: configure any non-compliant components, from the one or more components, with the most recent version or update of the logging library for the logging framework, wherein a non-compliant component does not have the most recent version or update of the logging library configured in the logging framework.

7. The system of claim 1, wherein the one or more processors, to perform the one or more control actions, are configured to: periodically scan to identify any new components that have been recently configured to integrate with the platform.

8. The system of claim 1, wherein the one or more processors, to perform the one or more control actions, are configured to: configure, in response to determining that a component is not configured with the most recent version or update of the logging library, the component with the most recent version or update of the logging library.

9. A method for obfuscating sensitive data, comprising: configuring, by a device and for a component that uses a platform, a logging library that is associated with a logging framework configured for the platform based on identifying whether the component is compliant with a most recent version or update of the logging library, wherein the logging library is configured to obfuscate the sensitive data, and wherein the logging library includes configuration information that is configured to cause the logging library to be executed for any log data generated for the component via the logging framework; obtaining, by the device and for the component, component data via the platform, wherein the component data is associated with one or more operations of the component; generating, by the device and via the logging framework, log data that includes obfuscated data generated via the logging library based on obtaining the component data, wherein the obfuscated data obfuscates any sensitive information in the log data; and performing, by the device and via the component, one or more actions using the log data.

10. The method of claim 9, further comprising: identifying one or more components, including the component, that are configured to integrate with the platform; and performing, for the platform, one or more control actions associated with configuring the logging library for the one or more components.

11. The method of claim 10, wherein performing the one or more control actions comprises: transmitting a report indicating any components, from the one or more components, that do not have the logging library configured in the logging framework.

12. The method of claim 10, wherein performing the one or more control actions comprises: configuring any non-compliant components, from the one or more components, with the most recent version or update of the logging library for the logging framework, wherein a non-compliant component does not have the most recent version or update of the logging library configured in the logging framework.

13. The method of claim 9, wherein the logging library includes one or more plugins for the logging framework.

14. The method of claim 9, wherein the logging library indicates one or more obfuscation rules, wherein a generation of the component data triggers the one or more obfuscation rules to be applied to the log data.

15. The method of claim 9, wherein performing the one or more actions comprises: storing, in a log repository, the log data.

16. A non-transitory computer-readable medium storing a set of instructions, the set of instructions comprising: one or more instructions that, when executed by one or more processors of a device, cause the device to: identify one or more components that are configured to integrate with a platform that outputs sensitive information; perform, for the platform, one or more control actions associated with configuring a logging library for the one or more components based on identifying whether each of the one or more components is compliant with a most recent version or update of the logging library, wherein the logging library is configured to obfuscate the sensitive information in logs of the one or more components, wherein the logging library is integrated within a logging framework that is configured for the platform, and wherein the logging library includes configuration information that is configured to cause the logging library to be executed for any log data generated for the one or more components via the logging framework; cause log data to be generated via the logging framework and based on component data of a component, wherein the log data includes obfuscated data generated via the logging library, and wherein the obfuscated data obfuscates any sensitive information in the log data; and store, via the component, the log data in a log reposi-
tory.

17. The non-transitory computer-readable medium of claim 16, wherein the logging library is included in a module of the logging framework.

18. The non-transitory computer-readable medium of claim 16, wherein the logging library indicates one or more obfus-
cation rules, wherein a generation of the component data triggers the one or more obfuscation rules to be applied to the log data.

19. The non-transitory computer-readable medium of claim 16, wherein the one or more instructions, that cause the device to perform the one or more control actions, cause the device to:

transmit a report indicating any components, from the one or more components, that do not have the logging library configured in the logging framework.

20. The non-transitory computer-readable medium of claim 16, wherein the one or more instructions, that cause the device to perform the one or more control actions, cause the device to:

configure any non-compliant components, from the one or more components, with the most recent version or update of the logging library for the logging frame-
work, wherein a non-compliant component does not have the most recent version or update of the logging library configured in the logging framework.

\* \* \* \* \*